United States Patent [19]
Nishimura et al.

[11] Patent Number: 4,462,613
[45] Date of Patent: Jul. 31, 1984

[54] SLIDER FOR AUTOMATIC SEAT BELT ARRANGEMENT

[75] Inventors: Yuji Nishimura, Nagoya; Hideki Tanaka, Toyota, both of Japan

[73] Assignees: Kabushiki Kaisha Tokai Rika Denki Seisakusho; Toyota Jidosha Kogyo Kabushiki Kaisha, both of Aichi, Japan

[21] Appl. No.: 362,130

[22] Filed: Mar. 26, 1982

[30] Foreign Application Priority Data

Mar. 28, 1981 [JP] Japan ................... 56-43866

[51] Int. Cl.³ .............................................. B60R 21/10
[52] U.S. Cl. ................................................... 280/804

[58] Field of Search ............... 280/802, 804; 297/469, 297/473; 16/93 R, 93 D

[56] References Cited

U.S. PATENT DOCUMENTS 4,325,569  4/1982  Suzuki et al. ..................... 280/804
4,343,489  8/1982  Suzuki et al. ..................... 280/804

Primary Examiner—Joseph F. Peters, Jr.
Assistant Examiner—Kenneth R. Rice
Attorney, Agent, or Firm—Wenderoth, Lind & Ponack

[57] ABSTRACT

A slider for an automatic seat belt arrangement includes a slider main body which can be readily manufactured at low cost in an efficient manner, and yet, is capable of having sufficient strength for use in a motor vehicle.

24 Claims, 18 Drawing Figures

Fig. 9(e)A 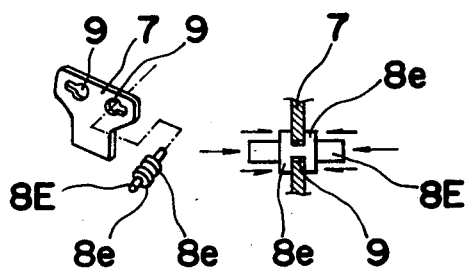 Fig. 9(e)B

Fig. 9(g)A 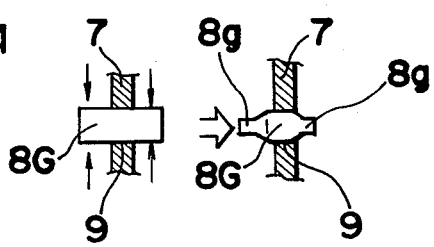 Fig. 9(g)B

SLIDER FOR AUTOMATIC SEAT BELT ARRANGEMENT

BACKGROUND OF THE INVENTION

The present invention generally relates to motor vehicle equipment and more particularly, to an improved slider for use in an automatic seat belt arrangement to be used in a motor vehicle for protection of a driver or passenger, and arranged to be automatically fastened or applied after the driver or passenger has taken his or her seat.

In the first place, one example of the automatic seat belt arrangement of this kind will be explained hereinbelow for better understanding.

Referring to FIGS. 1 and 2, the automatic seat belt arrangement is adapted to maintain a driver or passenger (not shown) in a restricted state by an outer webbing Wo and an inner webbing Wi. More specifically, one end of the outer webbing Wo extending across a seat S is connected to a rear lower portion of a vehicle door D through a buckle unit B which makes it possible to disengage the outer webbing Wo when necessary. Meanwhile, the other end of the outer webbing Wo is connected to a guide rail 10 mounted on a roof side R which constitutes one of side walls of the vehicle. As shown in FIG. 3, the guide rail 10 having a generally U-shaped cross section is formed therein with an anchor groove 11 for receiving therein an enlarged slider head portion 4 of a slider 1 to be described more in detail later, and lower slide groove 12 in which a driving tape 13 is slidably accommodated, while the end of the outer webbing Wo is coupled to a leg portion 2 of the slider 1. For such coupling, the end of the outer webbing Wo is fixed, by sewing, to an anchor plate 15 pivotally connected to the leg portion 2 of the slider 1 by a pin P engaged with a nut N, or detachably connected through a buckle device and the like (not shown).

The driving tape 13 accommodated in the lower slide groove 12 of the guide rail 10 is arranged to be movable in the longitudinal direction of the guide rail 10, and as the driving tape 13 is displaced, the slider 1 is also moved in the longitudinal direction of said guide rail 10. The driving tape 13 is capable of transmitting a pulling force and a pushing force in the longitudinal direction, and is arranged to be automatically driven through a sprocket arrangement (not shown), so that upon opening of the door D for entrance or exit of the passenger as shown in FIG. 2, the slider 1 is displaced towards the forward end of the guide rail 10 so as to bring the outer webbing Wo into a released state spaced from the seat S so as to permit free entrance or exit of the passenger, while upon closing of the door D, said slider 1 is moved to the rear end portion of the guide rail 10 and brings the outer webbing Wo close to the seat S, into a state ready to be fastened or applied to the passenger as shown in FIG. 1.

An intermediate portion of the outer webbing Wo respectively connected, at its opposite ends, to the door D and the roof side R as described above, extends through a through-ring O, which is also connected to the forward end of the inner webbing Wi, with a base portion of the inner webbing Wi being arranged to be wound onto a winding unit M. The winding unit M, adapted to wind up the inner webbing Wi by a biasing force, incorporates therein an inertia locking mechanism (not shown) for instantaneously suspending paying out of the webbing Wi by an acceleration sensor such as a pendulum or the like (not shown) in case of emergency for the motor vehicle. It is to be noted that the inner webbing Wi is arranged to be paid out from the winding unit M without being locked, when the door D is opened as shown in FIG. 2.

As is seen from the above description, the automatic seat belt arrangement has the construction as explained so far, and upon closing of the door D after the driver or passenger is seated on the seat S, the webbings Wo and Wi are automatically brought into the state ready to be fastened for enabling the passenger to wear the three point type seat belt. It is to be noted that the structure of the webbings Wo and Wi may be modified, depending on necessity, for example, into a shoulder belt and a lap belt (not shown) separately provided. Thus, the automatic seat belt arrangement as described in the foregoing is provided to eliminate the inconvenience for attaching or detaching the seat belt at each time of entrance or exit, and also to prevent the driver from driving the motor vehicle without fastening the seat belt due to troublesome procedures as described above.

Incidentally, as shown in FIG. 10, for manufacturing a slider F similar to the slider 1 as described earlier, it has been a conventional practice to prepare a slider main body Fb by hot-forging or casting, and to form an enlarged slider head portion (not shown) and a driving tape mounting portion (not shown) by molding of a synthetic resin, respectively at a head portion Fh and an intermediate mounting portion Fi of the main body Fb.

However, in the known practice as described above, there has been such a disadvantage that owing to the structure of the slider F, it is difficult to process the slider main body Fb in an efficient manner, with a consequent high manufacturing cost involved.

SUMMARY OF THE INVENTION

Accordingly, an essential object of the present invention is to provide an improved slider for an automatic seat belt arrangement in which a slider main body can be readily manufactured at low cost in an efficient manner, and yet, is capable of providing a sufficient strength for the slider.

Another important object of the present invention is to provide an improved slider of the above described type which is stable in functioning at high reliability, and with a favorable durability.

In accomplishing these and other objects, according to one preferred embodiment of the present invention, there is provided a slider for use in an automatic seat belt arrangement of a motor vehicle and the like, which is arranged to be connected to a webbing of the seat belt arrangement through a coupling member so as to be slidably moved within a guide rail for the seat belt arrangement, and displaced between one position for releasing the webbing and the other position for fastening the webbing according to selective opening and closing of a door of the motor vehicle. The slider includes, a slider main body prepared by processing a metallic plate through press work, a slider head portion provided at one end of the slider main body, an intermediate portion for mounting a driving tape mounting portion, provided at a generally middle portion of the slider main body, a leg portion provided at the other end of the slider main body for connecting thereto the coupling member for the webbing, at least a pair of pins fixedly provided on the slider head portion, and an enlarged slider head portion further formed on the slider head portion by covering outer peripheries of the slider head portion including said pins with a synthetic resin.

By the arrangement according to the present invention as described above, an improved slider for use in the automatic seat belt arrangement has been advantageously presented, with a substantial elimination of the disadvantages inherent in the conventional sliders of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE PREFERRED EMBODIMENTS

Figure 5:
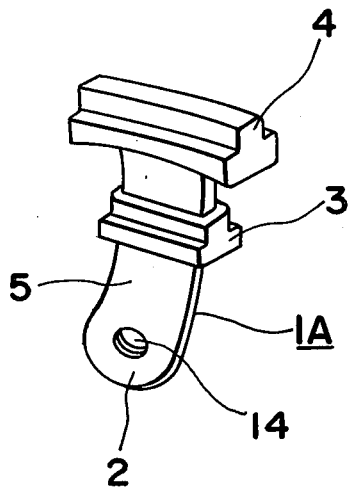
FIG. 5 is a perspective view of an improved slider according to one preferred embodiment of the present invention.
Figure 6:
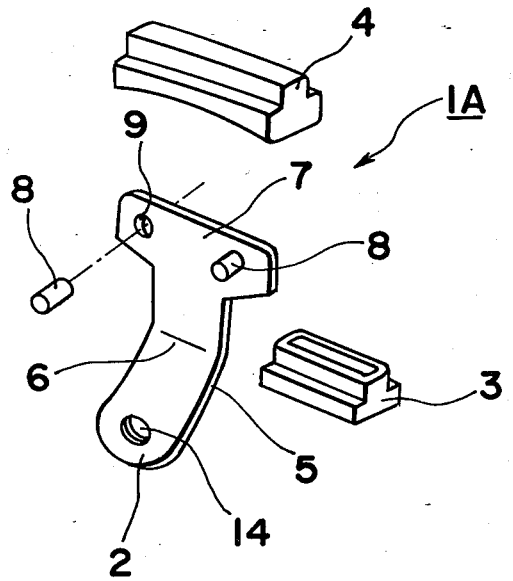
FIG. 6 is an exploded perspective view of the slider of FIG. 5, FIGS. 7 and 8 are perspective views of slider main bodies according to modifications of the slider of FIG. 5, FIGS. 9($a$) to 9($g$)B are fragmentary sectional views and a perspective view respectively showing various methods of fixing pins onto slider main bodies which may be applied to the slider according to the present invention.

Referring now to the drawings, there is shown, in FIGS. 5 and 6, a slider 1A according to one preferred embodiment of the present invention. The slider 1A generally includes a T-shaped main body 5 prepared by subjecting a steel plate such as chromium-molybdenum steel material or the like to press work, and a pair of spaced pins 8 respectively fixedly fitted into corresponding openings 9 formed in an upper head portion 7 of the main body 5. The pins 8 are to be rigidly secured to the main body 5 in a direction perpendicular to said upper head portion 7, in various ways as described in more detail with reference to FIGS. 9($a$) to 9($g$). The outer peripheries of the upper head portion 7 including the pins 8 are formed into an enlarged slider head portion 4 through molding of a synthetic resin, while an intermediate portion 6 of the main body 5 is also formed with a driving tape mounting portion 3 through molding of a synthetic resin to obtain the slider 1A as shown in FIG. 5.

Figure 3:
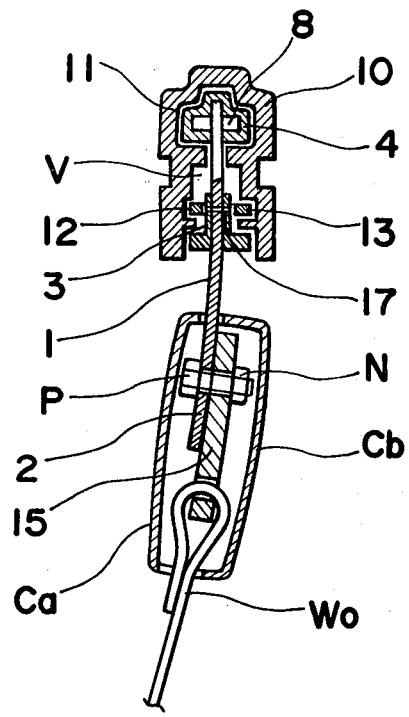
FIG. 3 is a fragmentary sectional view showing, on an enlarged scale, a slider assembly employed in the seat belt arrangement of FIGS. 1 and 2 (already referred to)
Figure 4:
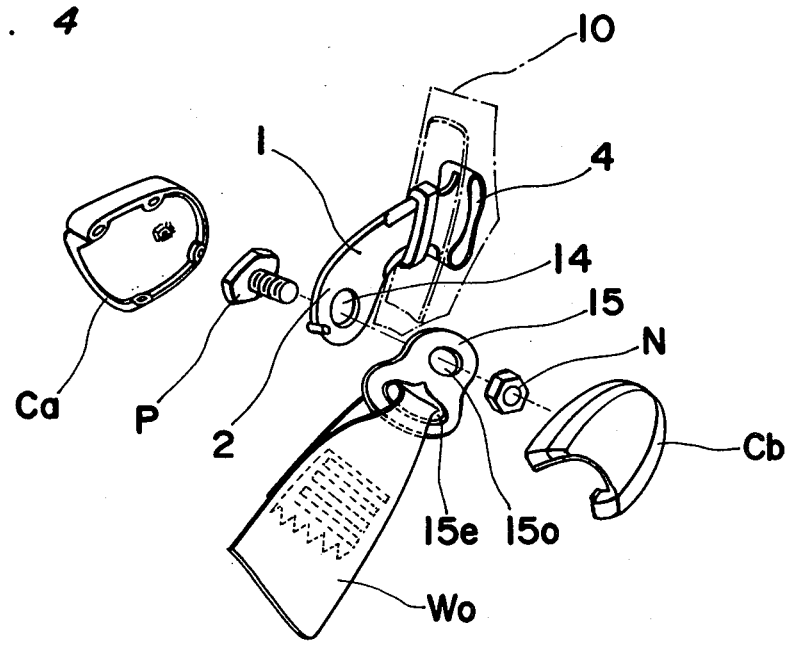
FIG. 4 is an exploded view of the slider assembly of FIG. 3 (already referred to)

Referring particularly to FIGS. 3 and 4, the guide rail 10 having a generally U-shaped cross section has a groove V including the upper anchor groove 11 in which the enlarged slider head portion 4 of the slider 1 covered by the synthetic resin is slidably accommodated for sliding movement of the slider 1 within the guide rail 10, and the lower slide groove 12 accommodating, in its narrow width portion, the driving tape 13 as also referred to earlier. To the leg portion 2 of the slider 1, the anchor plate 15 is connected by the bolt or pin P extending through a mounting opening 14 formed in the leg portion 2 of the slider 1 and another opening 15$o$ formed in the anchor plate 15, and engaged with the corresponding nut N. The end of the outer webbing Wo is passed through an elongated opening 15$e$ formed in the anchor plate 15 and suitably sewn together so as to be connected to said anchor plate 15 (FIG. 4) as shown.

Figure 1:
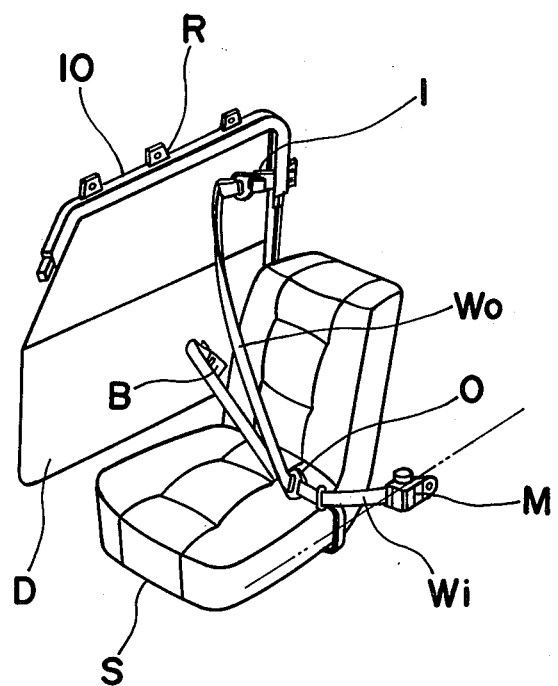
FIGS. 1 and 2 are fragmentary perspective views explanatory of functions of an automatic seat belt arrangement to which a slider according to the present invention may be applied (already referred to)
Figure 2:
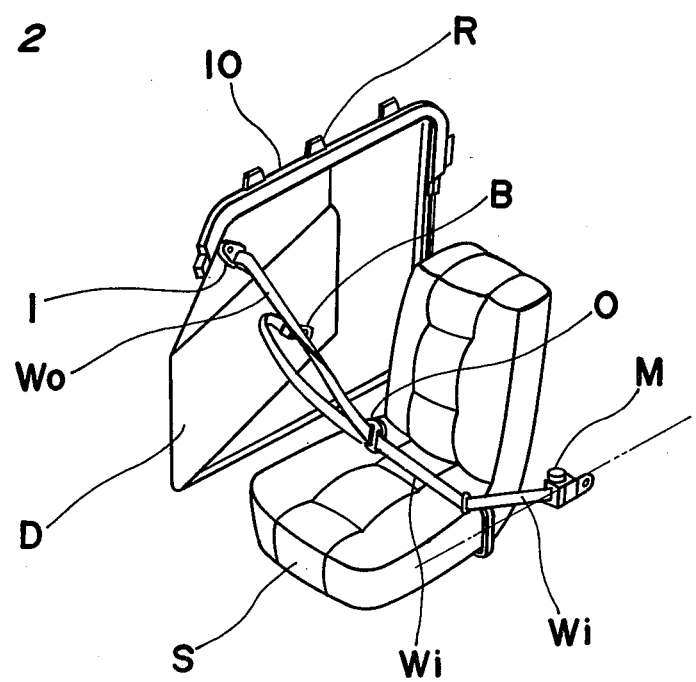

The driving tape 13 as shown in FIG. 3, is arranged to move in the longitudinal direction of the guide rail 10 within the lower slide groove 12 thereof as the door D (FIGS. 1 and 2) is opened or closed so as to displace the slider 1 along the guide rail 10 for effecting the automatic fastening of the seat belt in the manner as described earlier, and the driving tape 13, adapted to transmit the pulling force and pushing force in the longitudinal direction of the guide rail 10, is arranged to be automatically driven, for example, by a sprocket device (not shown). There is further provided as shown in FIG. 3, a fixing pin 17 for a driving tape mounting portion 3. It is to be noted here that, in the foregoing embodiment, although the driving tape mounting portion 3 and the slider head portion 4 are described as formed on the slider main body 5 through one piece molding, the construction may be so modified that these portions are separately formed or molded, and then, secured to the main body 5, for example, by an adhesive or the like. The connections between the leg portion 2 of the slider 1 and the anchor plate 15, and the anchor plate 15 and the outer webbing Wo are further surrounded by cover plates Ca and Cb coupled to each other by suitable means (not shown).

Figure 7:
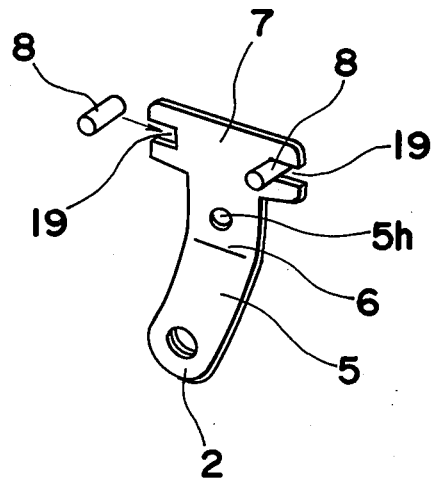
Figure 8:
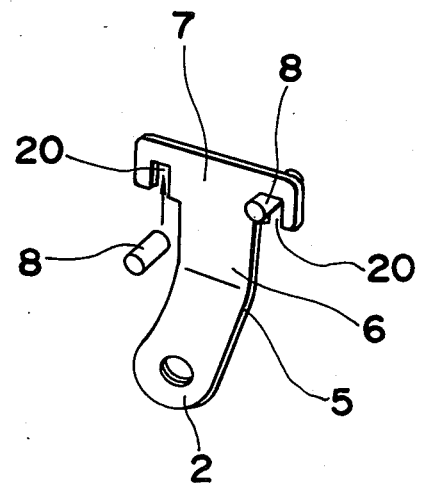
Figure 9A:
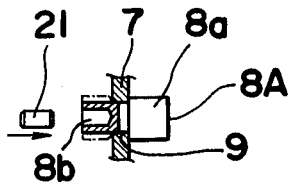
Figure 9B:
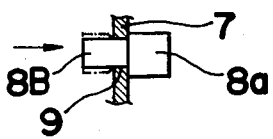
Figure 9C:
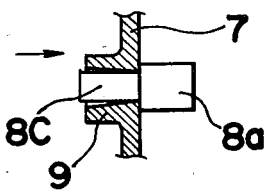
Figure 9D:
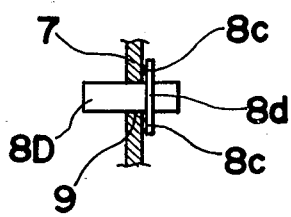
Figure 10:
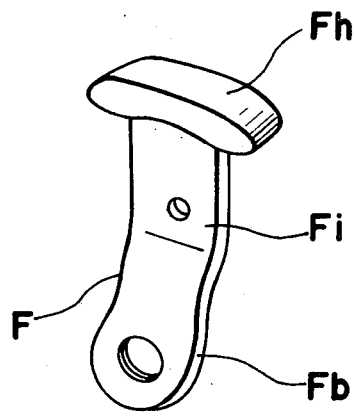
FIG. 10 is a perspective view of a main body of a conventional slider (already referred to).
Figure 9F:
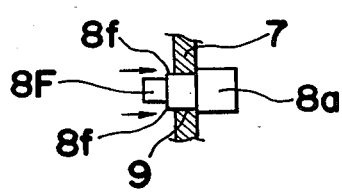

Referring to FIGS. 7 and 8, there are shown modifications of the arrangement of FIG. 6. In the modification of FIG. 7, the openings 9 described as formed in the upper head portion 7 of the main body 5 for fitting the pins 8 thereinto are replaced by notches 19 respectively formed laterally in the opposite side edges of the upper head portion 7 so as to force the pins 8 into the notches 19 in the lateral direction while a resin filling opening 5$h$ is formed for rigid mounting of the driving tape mounting portion 3 shown in FIGS. 5 and 6. Meanwhile, in the modification of FIG. 8, the openings 9 in FIG. 6 are replaced by notches 20 vertically formed in the lower edge of the upper head portion 7 for fitting the pins 8 thereinto under pressure. The resin filling opening 5$h$ as in FIG. 7 may of course be formed in this modification also depending on necessity, although not shown.

The modifications of FIGS. 7 and 8 are advantageous in that the notches 19 or 20 may be more easily formed than the openings 9 to be drilled, while fitting of the pins 8 into such notches may be effected in a more efficient manner during manufacturing.

Referring further to FIGS. 9($a$) to 9($g$), there are shown various methods for securing the pins 8 onto the head portion 7 of the slider main body 5.

In the arrangement of FIG. 9($a$), the reduced diameter end portion of a pin 8A having a head portion 8$a$ is inserted into the fixing opening 9 (or into the notches 19 and 20 of FIGS. 7 and 8), and a pressure pin 21 is forced into a bore 8$b$ formed in the end portion of the pin 8A for enlarging said end portion so as to fix the pin 8A securely to the upper head portion 7. In the above practice, a comparatively high dimensional accuracy may be obtained. In FIG. 9(b), the reduced diameter end portion of the pin 8B having the head portion 8a is inserted into the fixing opening 9 so as to fix the pin 8 by enlarging said end portion through pressing work thereof in its axial direction. In this arrangement, since the pin 8B is simple in configuration, its manufacturing is facilitated. In FIG. 9(c), the reduced diameter end portion of the pin 8C having the head portion 8a is inserted into a fixing opening 9 provided with a taper so as to fix the pin 8C by enlarging the diameter of said end portion through axial pressing thereof. The above arrangement is advantageous in that the pin 8C may be readily maintained at right angles with respect to the surface of the upper head portion 7. Meanwhile, in the arrangement of FIG. 9(d), the pin 8D is provided with a flange 8d having projections 8c directed downwards so as to fix the flange 8d to the upper head portion 7 of the main body 5 through projection welding. This arrangement of FIG. 9(d) has advantages in that the pin 8D can be readily directed at right angles with respect to the upper head portion 7, while no difference in strength may result at opposite sides of the pin 8D. In FIG. 9 (e)A, each of the fixing openings 9 is formed into a key hole-like configuration. As shown in FIGS. 9(e)A and B, pins 8E each having a pair of flange-shaped ribs 8e are inserted into the head of the key holes and then slid sideways into the narrow part of the key holes before fixing each pin 8E by axial pressing of the opposite ends of the pin 8E or the flange-shaped ribs 8e toward each other so as to compress a narrowed central portion therebetween. This arrangement is characterized in that the pins 8E may be readily directed at right angles with the upper head portion 7, with a sufficient strength at high reliability, and without any difference in strength at opposite sides with respect to said pin 8E. The arrangement of FIGS. 9(e)A and B may further be modified in such a manner that the two flange-like ribs 8e are extended towards the opposite ends of the pin 8E to form the pin 8E into a configuration narrowed only at its central portion, although not shown. In FIG. 9(f), a stepped portion 8f is provided at the forward end portion of the pin 8F having the head portion 8a so as to caulk the pin 8F by pressing said stepped portion 8f. In the above arrangement, the pin 8F has a simple shape, and its caulking may be readily effected. In FIG. 9(g)A, the pin 8G of the cylindrical shape is arranged to be compressed at its opposite ends in a direction perpendicular to its axis so as to form flat portions 8g at both sides of the upper head portion 7 for fixing the pin 8G. In this arrangement shown in FIG. 9(g)B, the shape of the pin 8G may be of the simplest form.

As is clear from the foregoing description, according to the present invention, since the slider main body may be formed by material processed by press work which is suitable for mass production, and the pins are fitted into the head portion of said main body, the production thereof is appreciably facilitated as compared with conventional slider main bodies processed by forging etc., with a consequent reduction of the manufacturing cost, and thus, a slider having a sufficient strength and durability can be advantageously manufactured at low cost.

Although the present invention has been fully described by way of example with reference to the accompanying drawings, it is to be noted here that various changes and modifications will be apparent to those skilled in the art. Therefore, unless such changes and modifications otherwise from the scope of the present invention, they should be construed as included therein.

What is claimed is:

1. A slider for use in an automatic seat belt arrangement of a motor vehicle and the like, which is arranged to be connected to a webbing of the seat belt arrangement through a coupling member so as to be slidably moved within a guide rail for said seat belt arrangement, and displaced between one position for releasing the webbing and the other position for fastening said webbing according to selective opening and closing of a door of the motor vehicle, said slider comprising:

a slider main body, a slider upper head portion, provided at one end of the slider main body, a driving tape mounting portion, provided at an intermediate portion of the slider main body, a leg portion, provided at the other end of the slider main body, for connecting thereto the coupling member for the webbing, at least a pair of pins, fixedly provided on the slider upper head portion, an enlarged slider head portion, further provided on the slider upper head portion, wherein said pins are secured to said slider upper head portion by forcing said pins into corresponding openings formed in said slider upper head portion, wherein said corresponding openings are notches laterally formed in opposite side edges of said slider upper head portion.

2. A slider as claimed in claim 1, wherein said enlarged slider head portion is formed on said slider upper head portion by molding.

3. A slider as claimed in claim 1, wherein said enlarged slider head portion is separately prepared and fixed onto said slider upper head portion by an adhesive.

4. A slider as claimed in claim 1, wherein said driving tape mounting portion is formed on said intermediate portion through molding.

5. A slider as claimed in claim 1, wherein said driving tape mounting portion is prepared separately and fixed onto said intermediate portion by an adhesive.

6. A slider as claimed in claim 1, wherein each of said pins has a head portion and an end portion with a reduced diameter extending through said corresponding opening of said slider upper head portion and formed therein with a bore, into which a pressure pin is to be forced so as to fix said pins to said slider upper head portion by enlarging the reduced diameter of said end portion of said pin.

7. A slider as claimed in claim 1, wherein each of said pins has a head portion and an end portion with a reduced diameter extending through said corresponding opening of said slider upper head portion, said head portion being axially compressed so as to fix said pins to said slider upper head portion by enlarging the reduced diameter of said end portion of said pin.

8. A slider as claimed in claim 1, wherein each of said pins has a head portion and an end portion with a reduced diameter extending through said slider upper head portion, said corresponding opening being each tapered so as to fix said pin by enlarging the reduced diameter of said end portion through compression thereof in order to fill up the tapered corresponding opening.

9. A slider as claimed in claim 1, wherein each of said pins has a head portion provided with a flange portion having a plurality of projections, and an end portion with a reduced diameter extending through said slider upper head portion, said flange portion being fixed to said slider upper head portion by welding at said projections.

10. A slider as claimed in claim 1, wherein each of said pins has a head portion and an end portion with a stepped portion extending through said slider upper head portion, said stepped portion being caulked to fix said pins to said slider upper head portion.

11. A slider as claimed in claim 1, wherein each of said pins has a head portion, has a cylindrical configuration, and is inserted into the corresponding opening at its one end so as to extend outwardly from the slider upper head portion at said one end, said one end and said head portion of said pin being formed into flattened portions at opposite sides of said slider upper head portion so that said pins are fixed onto said slider upper head portion.

12. A slider for use in an automatic seat belt arrangement of a motor vehicle and the like, which is arranged to be connected to a webbing of the seat belt arrangement through a coupling member so as to be slidably moved within a guide rail for said seat belt arrangement, and displaced between one position for releasing the webbing and the other position for fastening said webbing according to selective opening and closing of a door of the motor vehicle, said slider comprising:
 a slider main body,
 a slider upper head portion, provided at one end of the slider main body,
 a driving tape mounting portion, provided at an intermediate portion of the slider main body,
 a leg portion, provided at the other end of the slider main body, for connecting thereto the coupling member for the webbing,
 at least a pair of pins, fixedly provided on the slider upper head portion,
 an enlarged slider head portion, further provided on the slider upper head portion,
 wherein said pins are secured to said slider upper head portion by forcing said pins into corresponding openings formed in said slider upper head portion,
 wherein each of said corresponding openings have key hole-like configurations so that said pins have the same strength at opposite sides of said slider upper head portion.

13. A slider as claimed in claim 12, wherein each of said pins is provided with a pair of spaced flange-like ribs, said pin being inserted into a head of the key hole-like configuration of said corresponding opening and being slid into a narrow part of the key hole-like configuration of said corresponding opening so as to fix said pin to said slider upper head portion by selectively compressing one of opposite ends of said pin and said flange-like ribs of said pin in the axial direction thereof in order to compress a narrowed central portion of said pin between the opposite ends of said pin.

14. A slider for use in an automatic seat belt arrangement of a motor vehicle and the like, which is arranged to be connected to a webbing of the seat belt arrangement through a coupling member so as to be slidably moved within a guide rail for said seat belt arrangement, and displaced between one position for releasing the webbing and the other position for fastening said webbing according to selective opening and closing of a door of the motor vehicle, said slider comprising:
 a slider main body,
 a slider upper head portion, provided at one end of the slider main body,
 a driving tape mounting portion, provided at an intermediate portion of the slider main body,
 a leg portion, provided at the other end of the slider main body, for connecting thereto the coupling member for the webbing,
 at least a pair of pins, fixedly provided on the slider upper head portion,
 an enlarged slider head portion, further provided on the slider upper head portion,
 wherein said pins are secured to said slider upper head portion by forcing said pins into corresponding openings formed in said slider upper head portion,
 wherein said corresponding openings are notches vertically formed in lower edges of said slider upper head portion.

15. A slider as claimed in claim 14, wherein said enlarged slider head portion is formed on said slider upper head portion by molding.

16. A slider as claimed in claim 14, wherein said enlarged slider head portion is separately prepared and fixed onto said slider upper head portion by an adhesive.

17. A slider as claimed in claim 14, wherein said driving tape mounting portion is formed on said intermediate portion through molding.

18. A slider as claimed in claim 14, wherein said driving tape mounting portion is prepared separately and fixed onto said intermediate portion by an adhesive.

19. A slider as claimed in claim 14, wherein each of said pins has a head portion and an end portion with a reduced diameter extending through said corresponding opening of said slider upper head portion and formed therein with a bore, into which a pressure pin is to be forced so as to fix said pins to said slider upper head portion by enlarging the reduced diameter of said end portion of said pin.

20. A slider as claimed in claim 14, wherein each of said pins has a head portion and an end portion with a reduced diameter extending through said corresponding opening of said slider upper head portion, said head portion being axially compressed so as to fix said pins to said slider upper head portion by enlarging the reduced diameter of said end portion of said pin.

21. A slider as claimed in claim 14, wherein each of said pins has a head portion and an end portion with a reduced diameter extending through said slider upper head portion, said corresponding opening being each tapered so as to fix said pin by enlarging the reduced diameter of said end portion through compression thereof in order to fill up the tapered corresponding opening.

22. A slider as claimed in claim 14, wherein each of said pins has a head portion provided with a flange portion having a plurality of projections, and an end portion with a reduced diameter extending through said slider upper head portion, said flange portion being fixed to said slider upper head portion by welding at said projections.

23. A slider as claimed in claim 14, wherein each of said pins has a head portion and an end portion with a stepped portion extending through said slider upper head portion, said stepped portion being caulked to fix said pins to said slider upper head portion.

24. A slider as claimed in claim 14, wherein each of said pins has a head portion, has a cylindrical configuration, and is inserted into the corresponding opening at its one end so as to extend outwardly from the slider upper head portion at said one end, said one end and said head portion of said pin being formed into flattened portions at opposite sides of said slider upper head portion so that said pins are fixed onto said slider upper head portion.

* * * * *